July 24, 1923.  
W. O. BAYLESS  
1,462,999
LOCKING DEVICE FOR AUTOMOBILES
Filed March 3, 1921
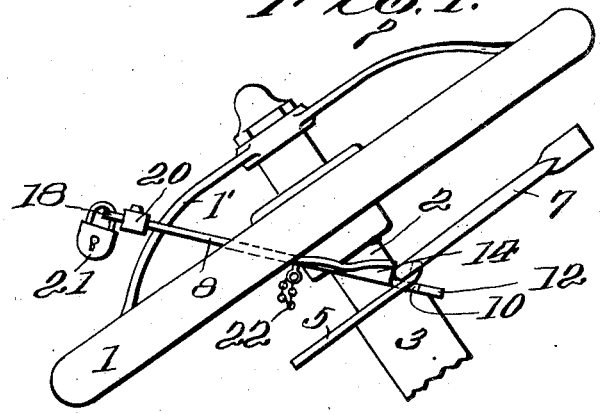
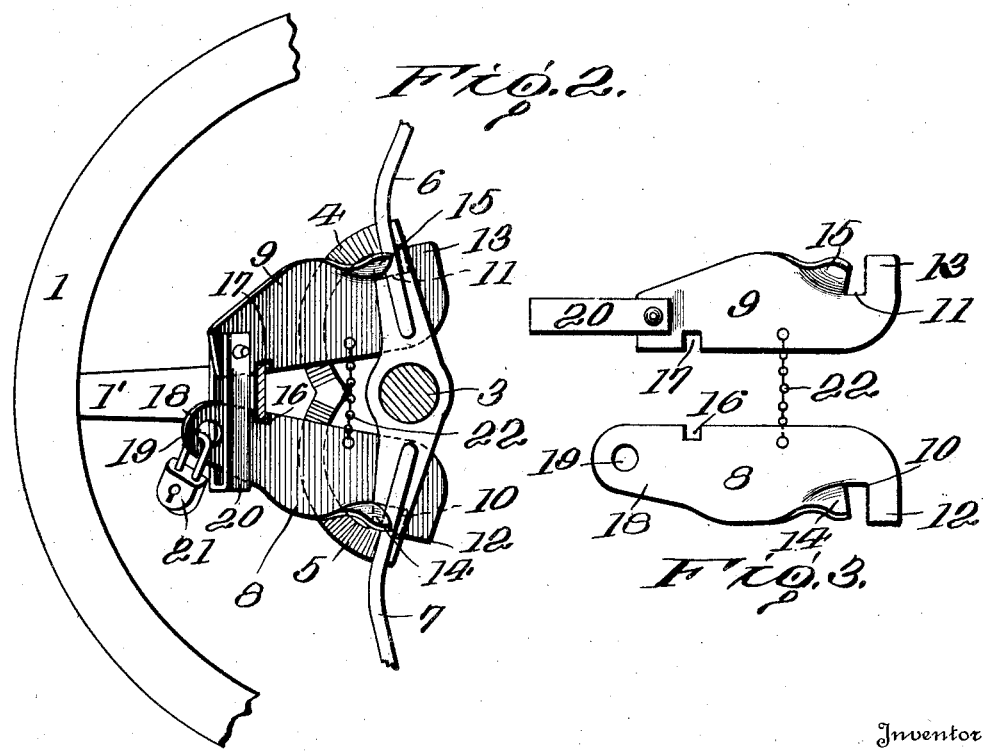
Inventor  
W. O. Bayless.
By  
Attorney Patented July 24, 1923.

1,462,999

UNITED STATES PATENT OFFICE.

WILLIAM O. BAYLESS, OF KNOXVILLE, TENNESSEE.

LOCKING DEVICE FOR AUTOMOBILES.

Application filed March 3, 1921. Serial No. 449,313.

*To all whom it may concern:*

Be it known that I, WILLIAM O. BAYLESS, a citizen of the United States, residing at Knoxville, in the county of Knox and State of Tennessee, have invented certain new and useful Improvements in Locking Devices for Automobiles, of which the following is a specification, reference being had therein to the accompanying drawing.

This invention relates to certain new and useful improvements in locking devices for automobiles and more particularly to a locking device especially adapted to be used for locking the steering wheel, throttle lever and spark lever, so as to prevent the vehicle from being started also from being towed.

Another and further object of the invention is to provide a locking device composed of a pair of loosely connected members adapted to be placed in position within the quadrants of the controlling levers and to embrace one of the spokes of the steering wheel, the construction of these members being such that they can readily be placed in position and locked by the use of an ordinary padlock so as to prevent these members from being moved.

A still further object of the invention is to provide a locking device which is exceedingly simple and cheap in construction, the parts being formed of sheet steel so as to be strong and durable whereby the locking device cannot be tampered with or distorted in any way so as to allow the members to be moved.

In the accompanying drawings:

Figure 1 is a side elevation of my improved construction of locking device, showing the application of same to the steering wheel of a motor vehicle.

Fig. 2 is a detail top plan view showing the locking device in position, and

Fig. 3 is a top plan view of the locking device detached.

In the drawings 1 indicates a steering wheel, 2 the steering post, and 3 the support therefor, which are of the ordinary construction now in use on motor vehicles of a well known type. Secured to the support 3 are quadrants 4 and 5, carrying the usual pivot control levers 6 and 7, the lever 6 being the spark lever for controlling the ignition system of the vehicle, and the lever 7, the throttle lever for controlling the fuel supply to the internal combustion engine. The above description being given so that the operation of my improved construction of locking device will be readily understood.

My improved construction of locking device comprises a pair of plates 8 and 9, preferably formed of sheet steel having notches 10 and 11 at their ends forming tongues 12 and 13. The inner edge or wall of the notches are turned out to form offset lugs 14 and 15 which are adapted to extend upwardly into the path of travel of the controlling levers 6 and 7 and these members are applied as will be later described.

The opposing edges of the members 8 and 9 are provided with registering notches 16 and 17 which are adapted to embrace the spoke 1' of the steering wheel. Member 8 is of greater length than member 9 and is provided with a reduced portion 18 having an opening 19 formed therein, the reduced portion 18 being adapted to receive a pivoted yoke 20 carried by the member 9 so that if said member has been forced over reduced portion 18 a padlock 21 can be inserted in the opening 19 so as to lock the two members together into position on the steering wheel of the motor vehicle.

The members 8 and 9 are loosely connected together by a chain 22 which allows the members to be placed in position on the quadrants of the steering wheel post support.

In placing the locking device in position on the steering wheel the members 8 and 9 are grasped by the hand and tongues 12 and 13 are forced down under the quadrants from the top, it of course being understood that the controlling levers 6 and 7 have been moved into closed position, as shown in Fig. 2. The members are then drawn together so that the notches 16 and 17 will embrace the spoke 1' of the steering wheel and the yoke 20 is swung over the reduced end 18 of the member 8 and a padlock is then inserted in the opening 19 which locks the members in the position shown.

The lugs 14 and 15 which are offset or turned upwardly, as clearly shown, embrace the levers 6 and 7 in such a manner that it is impossible to move these levers so as to start the engine and as the members are locked over the steering wheel it is impossible to turn the steering wheel to guide the vehicle if an attempt was made to tow the machine.

From the foregoing description it will be seen that I have provided a locking device for a motor vehicle composed of a pair of loosely connected members adapted to be inserted in the quadrants of the controlling levers and to embrace one of the spokes of the steering wheel in such a manner that the levers and steering wheel are securely locked.

What I claim is:

1. In a locking device of the kind described, the combination with a steering wheel, controlling levers and quadrants for said levers, of a pair of flat plates loosely connected together by a chain adapted to be inserted in the quadrants, said plates having notches at their ends, the edges of said notches being turned upwardly to form lugs adapted to be engaged by the controlling levers for preventing the levers from moving, said plates having registering notches adapted to receive one of the spokes of the steering wheel and a pivoted yoke carried by one of said levers adapted to embrace the other lever for locking said members together.

2. The combination with a steering wheel, controlling levers and quadrants of a motor vehicle, of a pair of members adapted to be interlocked with said quadrants having projections arranged in the path of travel of said levers, said members being provided with notches to receive one of the spokes of the steering wheel, a pivoted yoke carried by one of the said members adapted to embrace the other member and means for locking said pivoted yoke in position on said member.

3. The combination with a steering wheel, controlling levers and quadrants for said levers of a motor vehicle of a pair of members adapted to be inserted within the quadrants and to embrace the edges thereof, said members having projections arranged in the path of travel of said levers, the opposing edges of said members being provided with notches to receive one of the spokes of the steering wheel, a pivot yoke carried by one of said members adapted to embrace the other member for locking said members together and a padlock for holding said pivoted yoke in position on said member.

In testimony whereof I hereunto affix my signature.

WILLIAM O. BAYLESS.